United States Patent [19]
Haberkorn et al.

[11] Patent Number: 5,839,261
[45] Date of Patent: Nov. 24, 1998

[54] MOWER WITH AN IMPROVED OPERATING DEVICE

[75] Inventors: Jean-Paul Haberkorn, Monswiller; Jean-Pierre Fritsch, Hohengoeft, both of France

[73] Assignee: Kuhn S.A., Saverne Cedex, France

[21] Appl. No.: 832,833

[22] Filed: Apr. 3, 1997

[30] Foreign Application Priority Data

Apr. 17, 1996 [FR] France .................................. 96 05051

[51] Int. Cl.⁶ .................................................. A01D 34/66
[52] U.S. Cl. .................................... 56/6; 56/15.2; 56/15.5
[58] Field of Search ............................ 56/6, 7, 10, 14.9, 56/15.2, 15.5, 15.1, 15.7, 228, 255

[56] References Cited

U.S. PATENT DOCUMENTS

| | | |
|---|---|---|
| 3,593,504 | 7/1971 | Konig et al. . |
| 4,974,399 | 12/1990 | Haberkorn ..................................... 56/6 |
| 5,241,809 | 9/1993 | Wolff et al. . |
| 5,353,580 | 10/1994 | Wolff ........................................ 56/15.2 |

FOREIGN PATENT DOCUMENTS

| | | |
|---|---|---|
| 0 556 143 | 8/1993 | European Pat. Off. . |
| 2 675 980 | 11/1992 | France . |
| 91 12 331 | 1/1992 | Germany . |
| 41 10 430 | 10/1992 | Germany . |
| 6918351 | 6/1971 | Netherlands . |
| 9202216 | 7/1994 | Netherlands . |

*Primary Examiner*—Michael J. Carone
*Assistant Examiner*—Robert Pezzuto
*Attorney, Agent, or Firm*—Oblon, Spivak, McClelland, Maier & Neustadt, P.C.

[57] ABSTRACT

A mower including a cutting mechanism, a hitch structure, a carrying beam, and an operating device. The operating device makes it possible to bring the cutting mechanism at least into the work position and into the windrowing position. This operating device includes an operating member connected, among other things, to the cutting mechanism which includes a first lever, a second lever connected to the carrying beam and to said first lever, and a latch intended to stop the upward pivoting of the cutting mechanism when bringing into the windrowing position, and an operating element connected to said operating member and to the hitch structure.

18 Claims, 7 Drawing Sheets

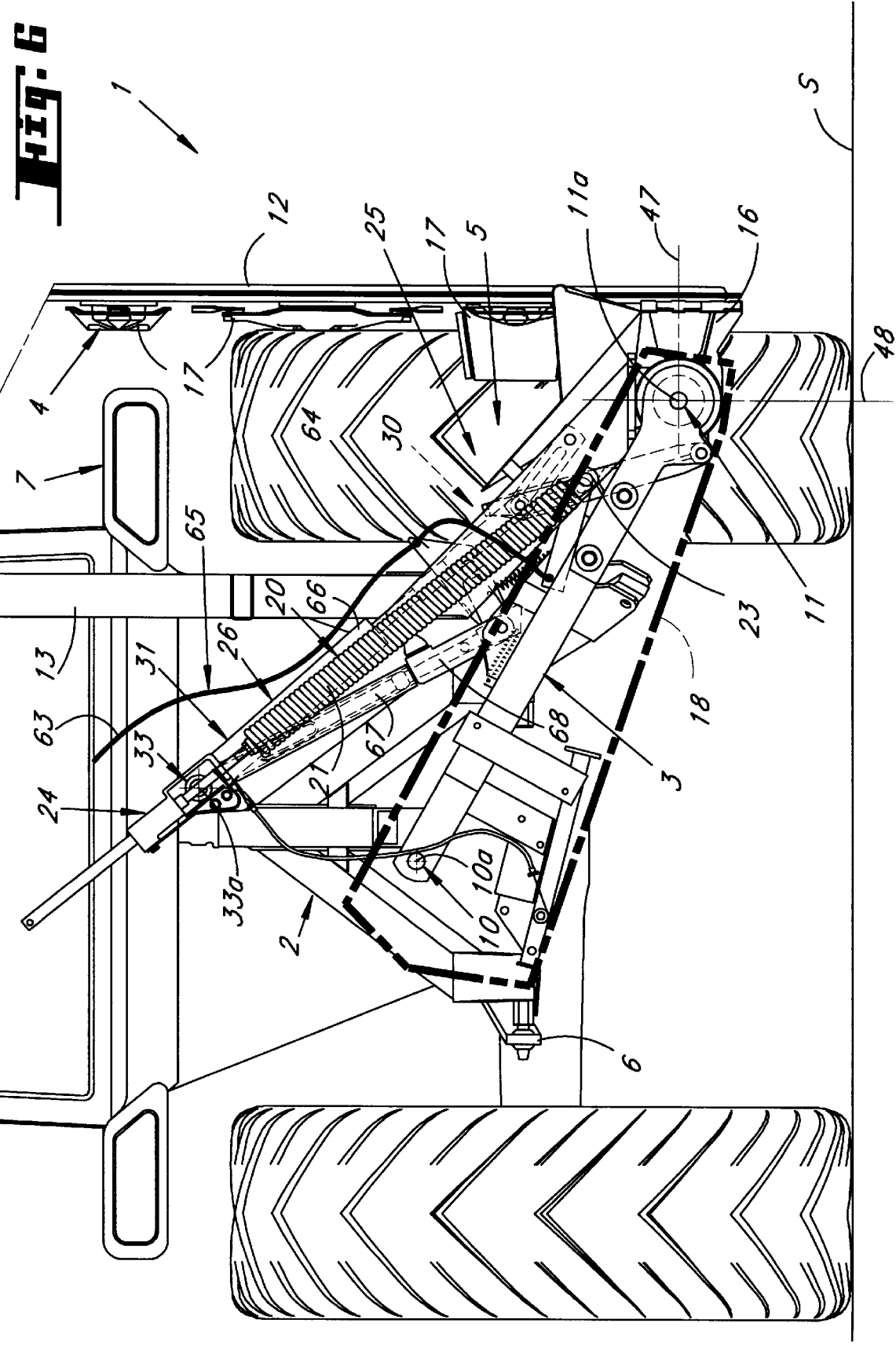

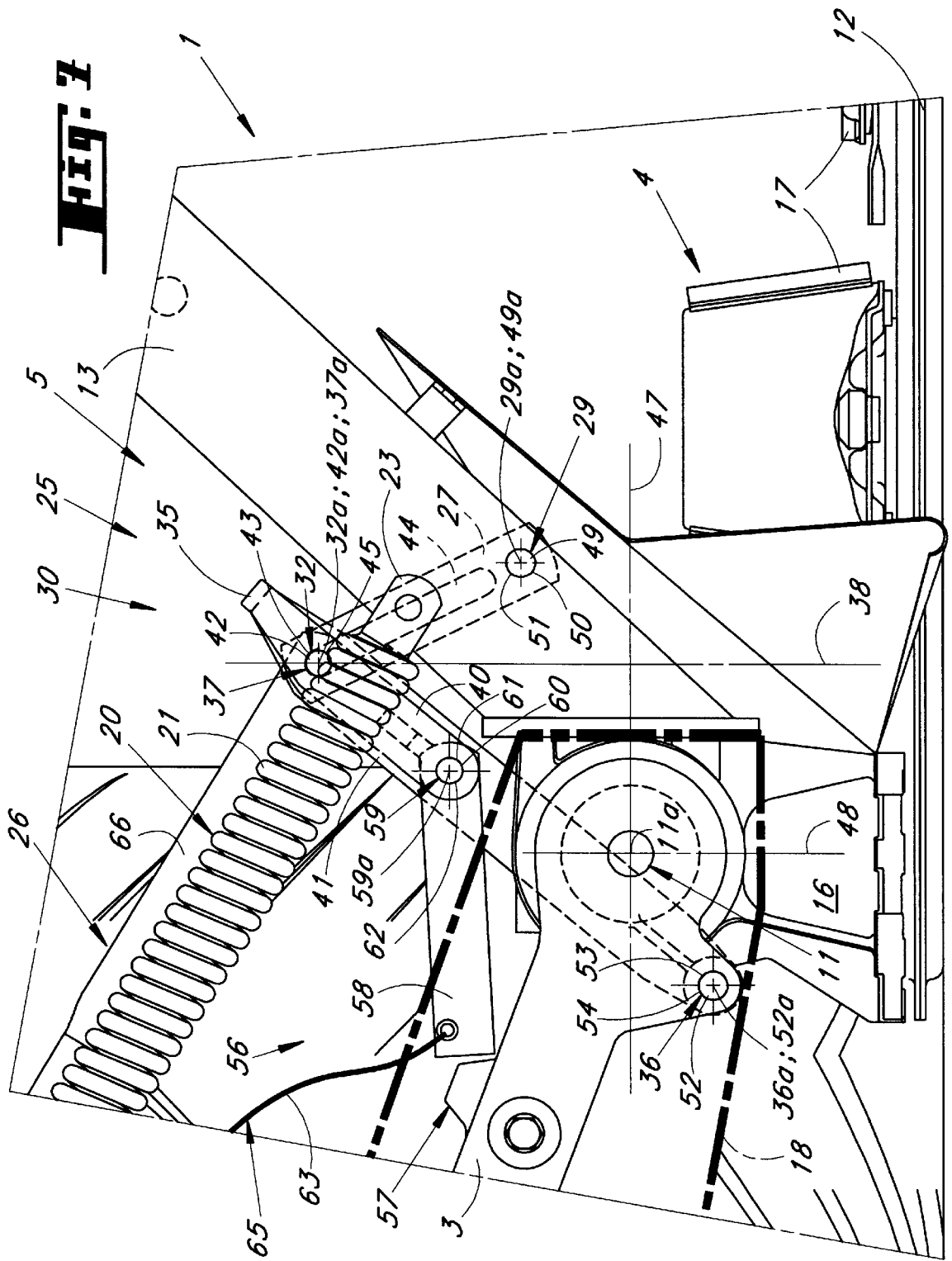

MOWER WITH AN IMPROVED OPERATING DEVICE

BACKGROUND OF THE INVENTION

1. Field of the Invention

The present invention relates to a mower including:

a cutting mechanism extending:
  in the work position, transversely to the direction of forward travel and level with the ground, and
  in the windrowing position, transversely to said direction of forward travel and a certain distance above the ground,
a hitch structure intended to be connected to the hitch device of a motor vehicle;
a carrying beam connected on the one hand to the hitch structure by means of a first articulation and on the other hand to the cutting mechanism by means of a second articulation;
an operating device making it possible to bring the cutting mechanism at least into the work position and into the windrowing position and including:
  an operating member connected, among other things, to the cutting mechanism and comprising a first lever connected to said cutting mechanism by means of a third articulation, and a latch intended to stop the upward pivoting of the cutting mechanism about the longitudinal axis of the second articulation during bringing into the windrowing position; and
  an operating element connected at one of its ends to said operating member by means of a fourth articulation and at the other of its ends to the hitch structure by means of a fifth articulation.

2. Discussion of the Background

Such a mower is known in the state of the art.

This mower includes a cutting mechanism, a hitch structure, a carrying beam connected on the one hand to said hitch structure by means of a first articulation and on the other hand to said cutting mechanism by means of a second articulation and an operating device allowing said cutting mechanism to be brought into the work position, into the windrowing position and into the transport position, and a device for lightening the cutting mechanism, including a spring connected on the one hand to the hitch structure and on the other hand to said cutting mechanism.

The operating device includes a lever connected on the one hand to the cutting mechanism by means of a third articulation and on the other hand to one of the ends of a jack by means of a fourth articulation. The jack is connected at the other of its ends to the hitch structure by means of a fifth articulation.

The operating device additionally includes a latch intended to stop the upward pivoting of the cutting mechanism about the longitudinal axis of the second articulation when bringing into the windrowing position, said latch being connected to the lever by means of an additional articulation. For this purpose, when bringing into the windrowing position, the latch comes to rest against a stop provided on the carrying beam in such a way as to prevent the cutting mechanism from pivoting.

During work, the cutting mechanism can adapt itself to the lie of the land by pivoting freely about the first and second articulations.

At the end of the plot, the operator actuates the jack which makes the lever pivot about the longitudinal axis of the third articulation until this lever comes up against a gearbox belonging to the cutting mechanism and from that moment on, the cutting mechanism pivots about the longitudinal axis of the second articulation until the latch comes to rest against the stop provided on the carrying beam.

As soon as the latch has come to rest against the stop, the cutting mechanism and the carrying beam pivot about the longitudinal axis of the first articulation until the operator stops actuating the jack or until a limiter halts the travel of the carrying beam.

In this windrowing position, the mower extends above the cut product or product to be cut, which makes it possible to carry out the manoeuvers required at the end of a plot in order to continue with the rest of the operations.

To return the mower to the work position, the operator again actuates the jack to make the mower return to its work position.

To bring the mower into the transport position, the operator retracts the latch so that it no longer limits the pivoting of the cutting mechanism about the longitudinal axis of the second articulation so that the cutting mechanism can pivot into a transport position in which it extends substantially vertically.

However, this known mower has a certain number of drawbacks.

A first drawback lies in the fact that in order to obtain good adaptation of the cutting mechanism to the lie of the land, which, in particular, means said cutting mechanism having a large angle of pivoting about the longitudinal axis of the second articulation, it is necessary to employ a jack with a long stroke, which works out quite expensive and increases the time taken to manoeuver the cutting mechanism.

A second drawback lies in the fact that in a specific work position, when the cutting mechanism is pivoted downward about the longitudinal axis of the second articulation as is often the case when mowing products along the side of a ditch, it is impossible for the operator to bring the mower into its windrowing and transport position. This is because when the operator actuates the jack then, depending on the distribution of weights and on the various lever arms which apply to the cutting mechanism and the carrying beam, this jack merely pivots the carrying beam upward about the longitudinal axis of the first articulation while, under the effect of its self weight, the cutting mechanism pivots more and more downward about the longitudinal axis of the second articulation.

An additional drawback of this mower lies in the fact that the forces in the lever are relatively high, which means that components of relatively high mass and therefore high cost are required.

SUMMARY OF THE INVENTION

The object of the present invention is to overcome the drawbacks of the mower of the prior art, while having a capability of correctly placing the cutting mechanism in the windrowing position.

To this end, the mower according to the invention is one wherein the operating member additionally includes a second lever connected on the one hand to the carrying beam by means of a sixth articulation and on the other hand to the first lever by means of a seventh articulation.

Such a mower makes it possible, using an operating element which enjoys a relatively short stroke, to bring the cutting mechanism effectively and quickly into the various positions. Furthermore, the various components involved are subject to less severe stresses, which makes it possible to make the mower even more reliable and to produce it on a smaller budget.

The invention also relates to the following features taken in isolation or in any technically possible combination:

- said articulations have a respective axis pointing forward, preferably substantially in the direction of forward travel during work;
- in the normal work position (cutting mechanism at least substantially horizontal), the seventh articulation connecting the second lever to the first lever is situated higher up than the second articulation connecting the carrying beam to the cutting mechanism so that the cutting mechanism is pivoted upward upon actuation of the operating element;
- in the normal work position and viewed along the longitudinal axis of the second articulation connecting the carrying beam to the cutting mechanism, the seventh articulation connecting the second lever to the first lever is situated between said second articulation and the third articulation connecting the first lever to the cutting mechanism;
- viewed along the longitudinal axis of the second articulation connecting the carrying beam to the cutting mechanism, the seventh articulation connecting the second lever to the first lever is substantially coincident with the fourth articulation connecting the operating element to the operating member;
- the third articulation connecting the first lever to the cutting mechanism is situated above the horizontal plane containing the longitudinal axis of the second articulation connecting the carrying beam to the cutting mechanism, whereas the sixth articulation connecting the second lever to the carrying beam is situated below said horizontal plane;
- the sixth articulation connecting the second lever to the carrying beam is situated on the same side of the vertical plane containing the longitudinal axis of the second articulation connecting the carrying beam to the cutting mechanism as the hitch structure, whereas the third articulation connecting the first lever to the cutting mechanism is situated on the other side of said vertical plane;
- the latch is intended to come to rest against a stop provided on the carrying beam so that the upward pivoting of the cutting mechanism about the longitudinal axis of the second articulation is stopped at a given moment;
- in the normal work position, the latch is in contact with the stop or at least extends into the vicinity thereof so that the upward pivoting of the cutting mechanism about the longitudinal axis of the second articulation is stopped immediately or almost immediately as soon as the operating element is actuated;
- the cutting mechanism is, for transport, pivoted upward about the longitudinal axis of the second articulation in a substantially vertical position or beyond and the latch and/or the stop can be retracted to allow said pivoting;
- the latch is designed to be retractable and its effect may be neutralized using a remote-control device;
- the latch consists of a third lever connected to the second lever by means of an eighth articulation;
- the eighth articulation connecting the third lever to the second lever has an axis pointing forward, preferably substantially in the direction of forward travel during work;
- a means is provided which, in the work position, allows the cutting mechanism to move freely about the longitudinal axis of the second articulation connecting the carrying beam to said cutting mechanism so as to favor further the adaptation of the cutting mechanism to the lie of the land;
- the means consists of an oblong hole made longitudinally in the first lever and in which the fourth articulation connecting the operating element to said first lever can slide freely;
- in the work position, the operating element allows the operating member to move freely in order to follow the movements of the cutting mechanism.

BRIEF DESCRIPTION OF THE DRAWINGS

Further objects and features will emerge from the description hereafter with reference to the attached drawings which represent, by way of nonlimiting examples, one embodiment of the mower according to the invention.

In these drawings:

FIG. 6 represents, in the transport position, the mower of FIG. 1, viewed from behind;

FIG. 7 represents a partial enlargement of the mower of FIG. 1.

DESCRIPTION OF THE PREFERRED EMBODIMENT

Figure 1:
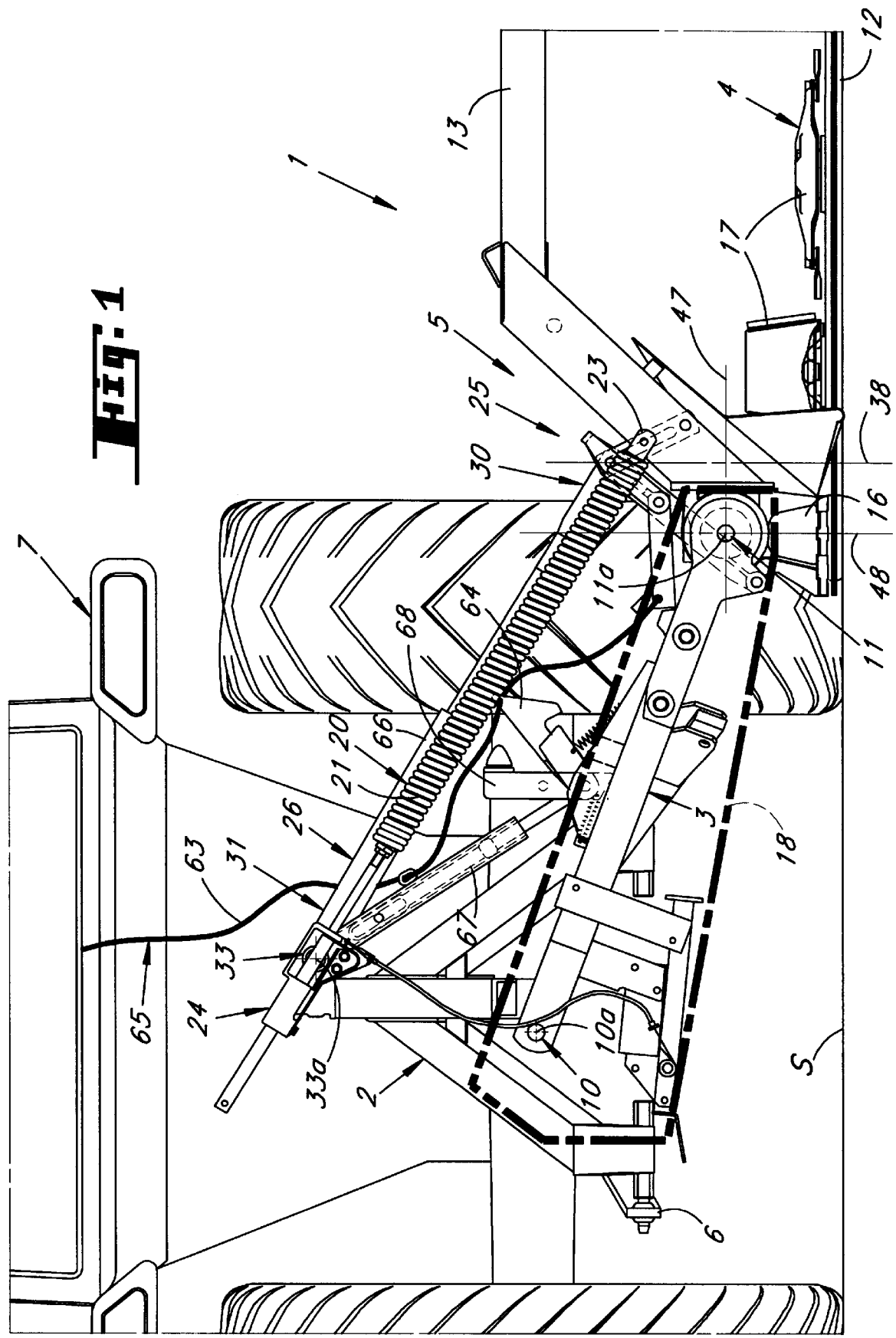
FIG. 1 represents, in the normal work position, a mower according to the invention viewed from behind and connected to a motor vehicle.

The mower 1 represented in FIGS. 1 to 6 is similar to the one described in the document FR-A-2 675 980. For further details reference can, if necessary, be made to the text of said document.

Broadly speaking, the mower 1 is composed of a hitch structure 2, of a carrying beam 3, of a cutting mechanism 4 and of an operating device 5.

The hitch structure 2 is connected to a hitch device 6 of a motor vehicle 7. The carrying beam 3 for its part, during work, extends transversely to the direction of forward travel 9 and downward toward the cutting mechanism 4.

At one of its longitudinal ends, the carrying beam 3 is connected to the hitch structure 2 by means of a first articulation 10 of at least substantially horizontal longitudinal axis 10a pointing in the direction of forward travel 9. At the other longitudinal end, the carrying beam 3 is connected to the cutting mechanism 4 by means of a second articulation 11 of longitudinal axis 11a at least substantially parallel to the longitudinal axis 10a of the first articulation 10.

Figure 2:
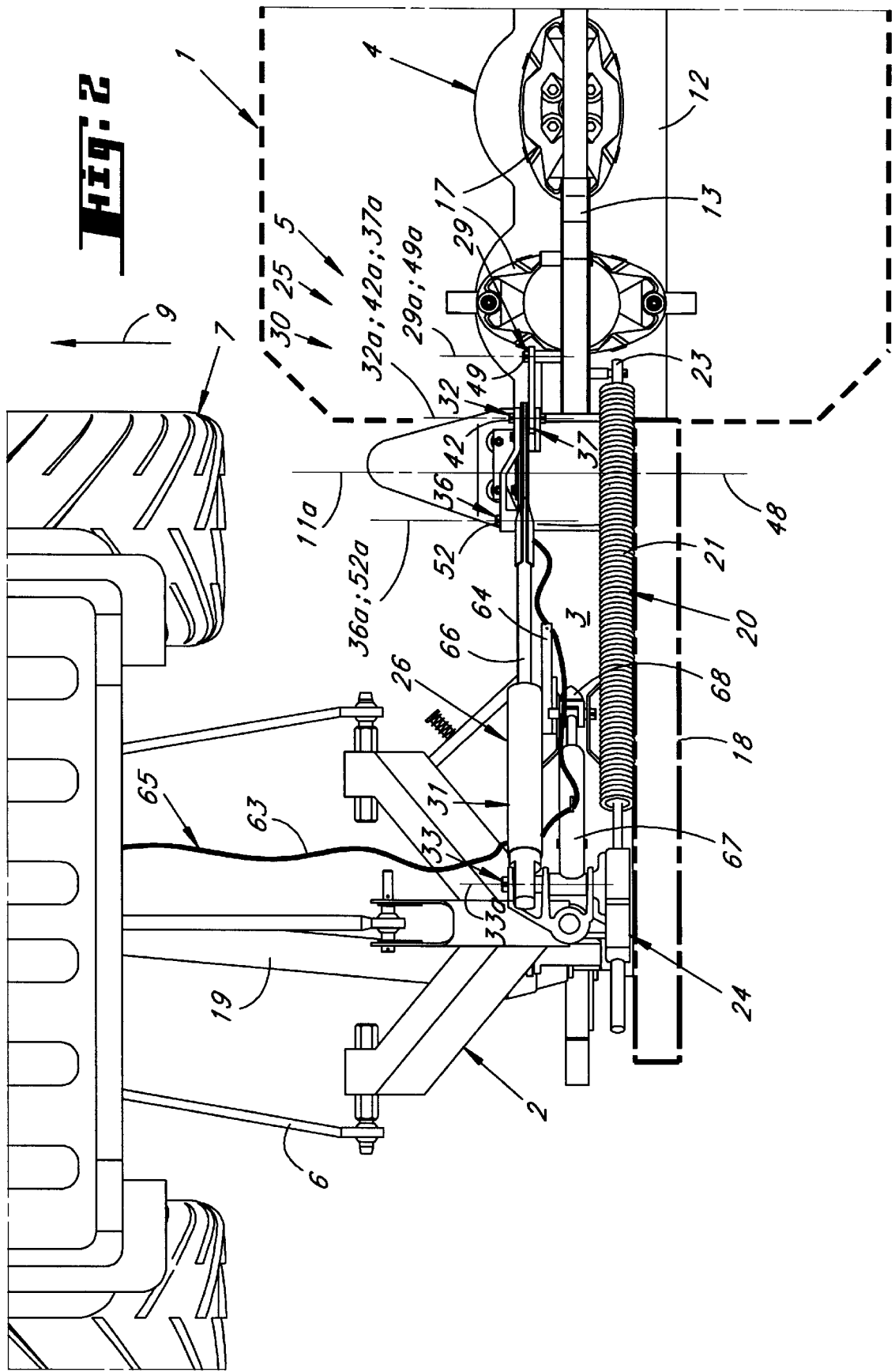
FIG. 2 represents the mower of FIG. 1, viewed from above.
Figure 3:
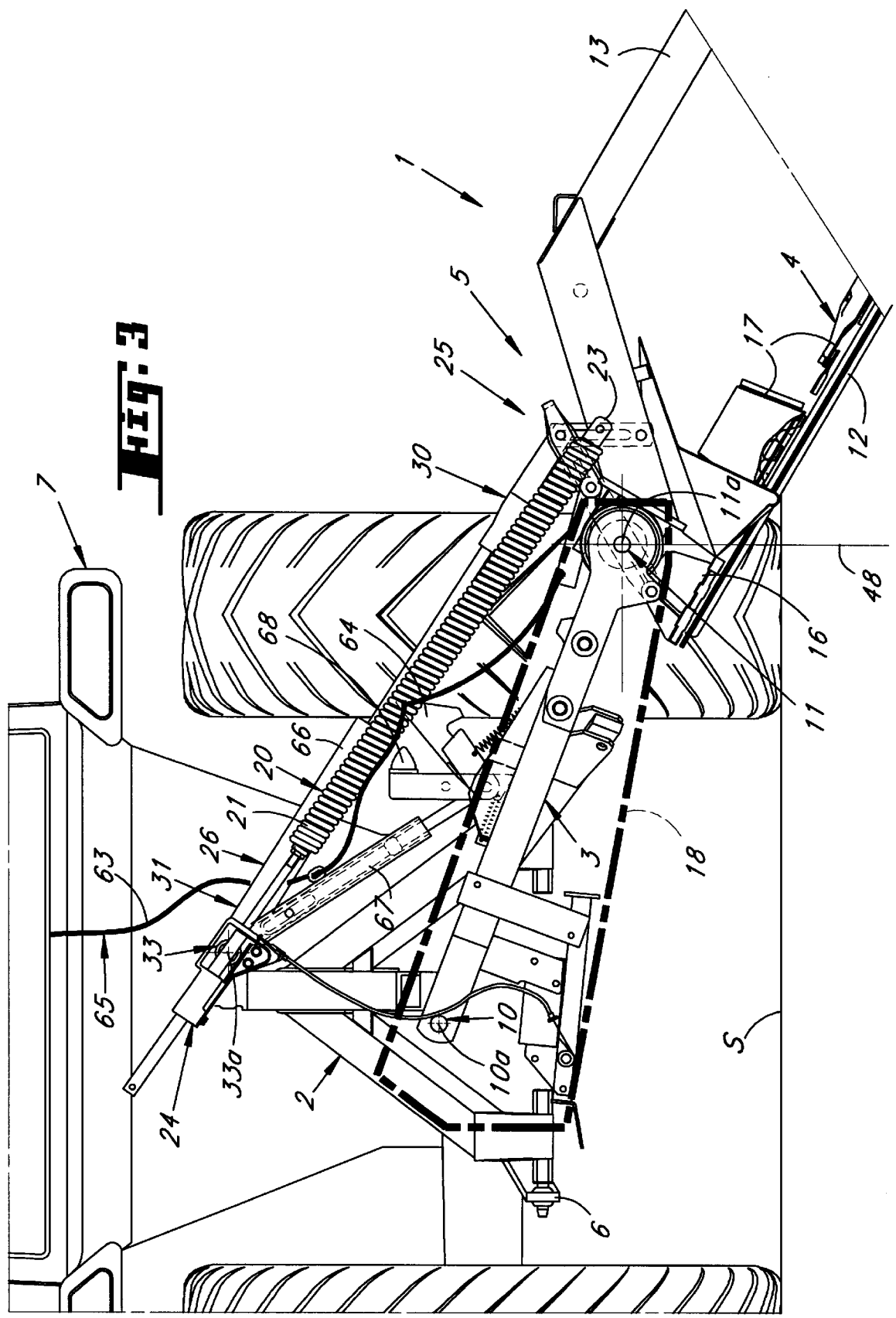
FIG. 3 represents, in the fully lowered work position, the mower of FIG. 1, viewed from behind.
Figure 4:
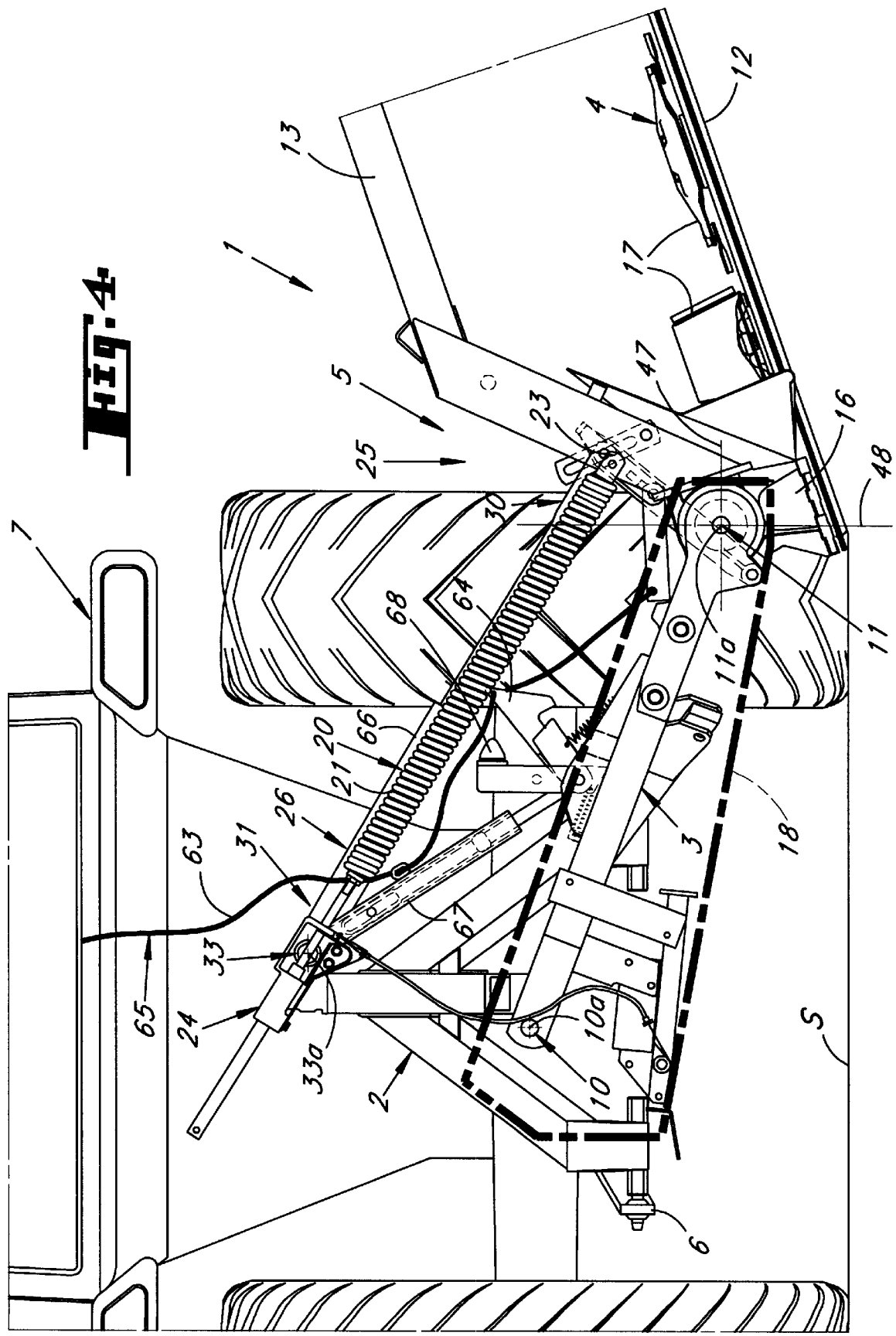
FIG. 4 represents, in a specific work position (cutting mechanism pivoted upward about the second articulation), the mower of FIG. 1, viewed from behind.

Broadly speaking, the cutting mechanism 4 includes a cutter bar 12 surmounted by a carrying structure 13 intended especially to support guards (represented in broken line in FIG. 2). This carrying structure 13 is fixed to the cutter bar 12 by means of a gearbox 16. This gearbox 16 on the one hand connects the cutter mechanism 4 to the carrying structure 3 and on the other hand contains some of the drive members intended for driving the cutting elements 17 of the cutter bar 12.

Extending behind the carrying beam 3 is a transmission device 18 (represented diagrammatically in chain line) which is intended to be driven by means of a universal-jointed transmission shaft 19 connected to the power take-off (not represented) of the motor vehicle 7. This transmission device 18 is intended to drive the drive members in the gearbox 16.

Also provided is a lightening device 20 including a draw-spring 21 connected on the one hand at one of its ends to a lower tie-rod 23 itself connected to the carrying structure 13 of the cutting mechanism 4 and on the other hand, at the other end, to an operating device 24 known to those skilled in the art.

Figure 5:
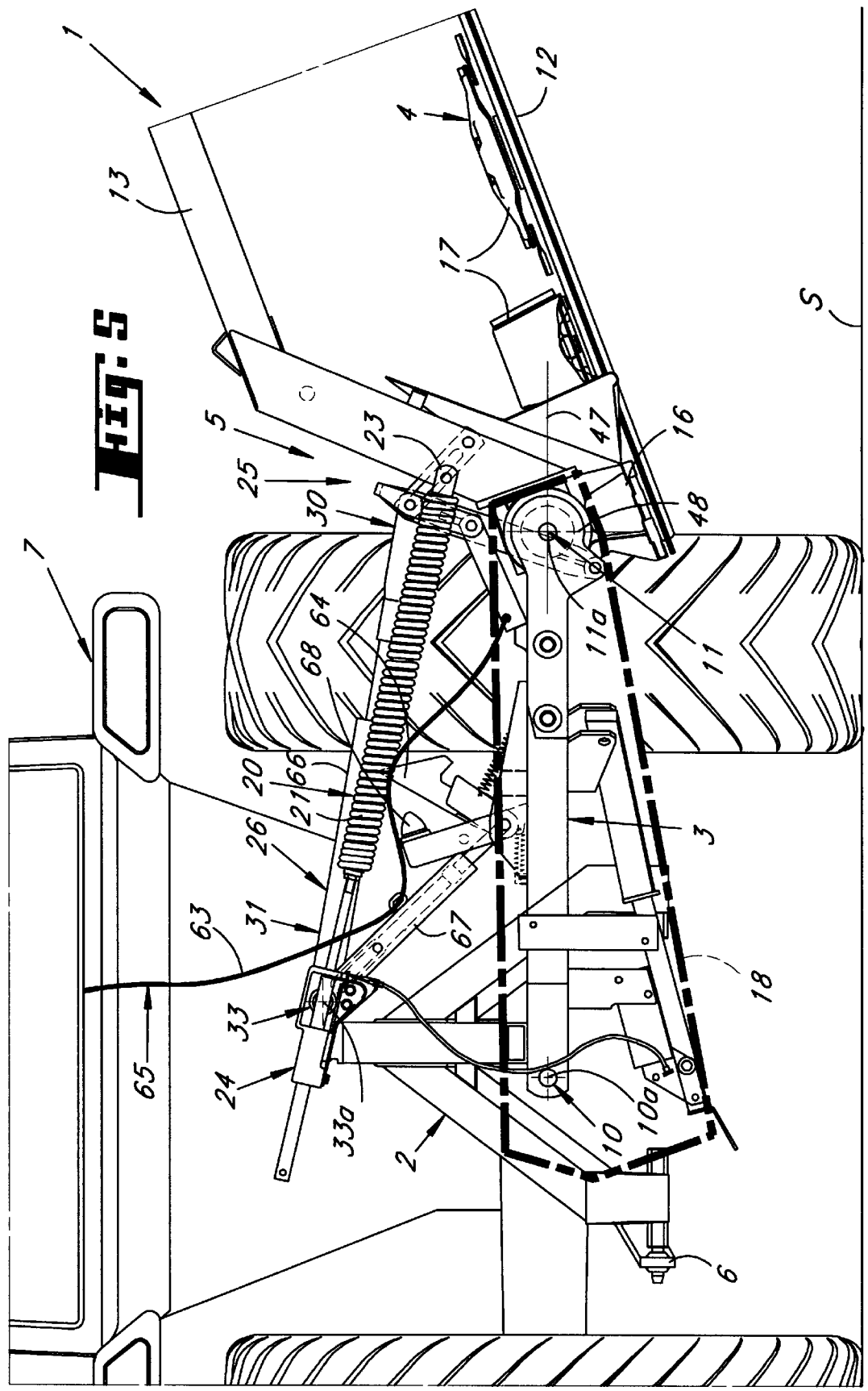
FIG. 5 represents, in the windrowing position, the mower of FIG. 1, viewed from behind.

The operating device 5 allows the cutting mechanism 4 to be brought into the transport position (FIG. 6), into the work position (FIGS. 1 to 4) and into the windrowing position (FIG. 5).

For this purpose, the operating device 5 includes an operating member 25 and an operating element 26. The operating member 25 includes a first lever 27 connected to the carrying structure 13 of the cutting mechanism 4 by means of a third articulation 29 of longitudinal axis 29a at least substantially parallel to the longitudinal axis 11a of the second articulation 11. The operating element 26 is connected at one 30 of its ends 30, 31 to the operating member 25 by means of a fourth articulation 32 of longitudinal axis 32a at least substantially parallel to the longitudinal axis 11a of the first articulation 11 and at the other of its ends 30, 31 to the hitch structure 2 by means of a fifth articulation 33 of longitudinal axis 33a at least substantially parallel to said longitudinal axis 32a.

It will be noted that the operating member 25 additionally includes a second lever 35 connected on the one hand to the carrying beam 3 by means of a sixth articulation 36 of longitudinal axis 36a and on the other hand to the first lever 27 by means of a seventh articulation 37 of longitudinal axis 37a, said longitudinal axes 36a, 37a being at least substantially parallel to the longitudinal axis 11a of the second articulation 11.

In the light of FIGS. 1, 2 and 7, it may be seen that the first lever 27 and the second lever 35 extend transversely to the direction of forward travel 9 and converge upward so that in the normal work position, when the cutting mechanism 4 is extending at least substantially horizontally, said first lever 27 extends upward in the direction of the hitch structure 2, and the second lever 35 extends upward in the opposite direction to that of said hitch structure 2. In the normal work position, the seventh articulation 37 connecting the second lever 35 to the first lever 27 is situated on the one hand higher up than the second articulation 11 connecting the carrying beam 3 to the cutting mechanism 4 and on the other hand, viewed along the longitudinal axis 11a of said second articulation 11, is situated in a vertical plane 38 pointing in the direction of forward travel 9 and arranged between said second articulation 11 and the third articulation 29 connecting the first lever 27 to the carrying structure 3 of the cutting mechanism 4. It will be observed that the longitudinal axis 37a of the seventh articulation 37 is substantially coincident with the longitudinal axis 32a of the fourth articulation 32. For this purpose, according to the example represented, the second lever 35 includes, in the region of the seventh articulation 37, two flanges 40, 41 between which the first lever 27 and the end 30 of the operating element 26 extend. A journal 42 of longitudinal axis 42a coincident with the longitudinal axes 32a, 37a of the fourth and of the seventh articulations 32, 37 extends right through the two flanges 40, 41 of the second lever 35, the first lever 27 and the end 30 of the operating element 26 by means, respectively, of a first hole 43, of an oblong hole 44 and of a second hole 45. This oblong hole 44 is made longitudinally in the first lever 27 in which the fourth articulation 32 connecting the operating element 26 with said first lever 27 and, respectively, the journal 42 can slide freely. The fourth articulation 32 and, respectively, the journal 42, which can slide freely in the oblong hole 44, constitute a means which, in the work position, allows the cutting mechanism 4 to move freely about the longitudinal axis 11a of the second articulation 11 so as to favor the adaptation of said cutting mechanism 4 to the lie of the land.

In the normal work position, the third articulation 29 connecting the first lever 27 to the cutting mechanism 4 is situated on the one hand above the horizontal plane 47 containing the longitudinal axis 11a of the second articulation 11 and on the other hand on the other side of a second vertical plane 48 containing the longitudinal axis 11a of said second articulation 11 of the hitch structure 2. More precisely, in the normal work position, the third articulation 29 is situated on the other side of the first vertical plane 38 of the hitch structure 2 and at least substantially the same distance from said first vertical plane 38 as from the horizontal plane 47. According to the example represented, the third articulation 29 also includes a journal 49 of longitudinal axis 49a coincident with the longitudinal axis 29a of said third articulation 29, said journal 49 extending on the one hand through a third hole 50 provided in the carrying structure 13 and on the other hand through a fourth hole 51 provided at the end of the first lever 27.

In the normal work position, the sixth articulation 36 connecting the second lever 35 to the carrying beam 3 is situated on the one hand below said horizontal plane 47 and on the other hand on the same side of the second vertical plane 38 as the hitch structure 2. More precisely, the sixth articulation 36 is situated at least substantially the same distance from the second vertical plane 48 as from the horizontal plane 47. According to the example represented, the sixth articulation 36 includes a journal 52 of longitudinal axis 52a coincident with the longitudinal axis 36a of said sixth articulation 36. The journal 52 extends on the one hand through a fifth hole 53 provided in the carrying beam 3 and on the other hand through a sixth hole 54 provided at the end of the second lever 35.

It will be further noted that, in the normal work position, the distance separating the third articulation 29 and the second articulation 11 is greater than the distance separating the sixth articulation 36 and said second articulation 11.

In the light of the various figures it may also be seen that a latch 56 is provided, this being intended to stop the upward pivoting of the cutting mechanism 4 about the longitudinal axis 11a of the second articulation 11 when bringing into the windrowing position. The latch 56 is intended to come to rest against a stop 57 provided on the carrying beam 3. For this purpose, the latch 56 consists of a third lever 58 connected to the second lever 35 by means of an eighth articulation 59 of longitudinal axis 59a at least substantially parallel to the longitudinal axis 11a of the second articulation 11.

This eighth articulation 59 includes a journal 60 of longitudinal axis 60a coincident with the longitudinal axis 59a of said eighth articulation 59. This journal 60 extends right through the two flanges 40, 41 of the second lever 35 by means of a seventh hole 61 and through an eighth hole 62 provided at the end of the third lever 58. According to the example represented, the eighth articulation 59 is situated between the sixth articulation 36 and the seventh articulation 37. More precisely, said eighth articulation 59 is, in the normal work position and viewed in the direction of forward travel 9, situated on the one hand substantially mid-way between the first vertical plane 38 and the second vertical plane 48 and on the other hand substantially at the same height as the stop 57 so that the third lever 58 extends substantially horizontally. In this normal work position, the third lever 58 of the latch 56 extends in close proximity to the stop 57.

At the opposite end of the eighth articulation 59, the third lever 58 is connected to a string 63 which is also connected to a catch 64 intended, in the transport position, to catch on the carrying structure 13 of the cutting mechanism 4.

This string 63 is intended to be actuated from the motor vehicle 7 in order, on the one hand, to pivot said third lever 58 upward about the longitudinal axis 59a of the eighth articulation 59 in order to neutralize the effect of the latch 56 and, on the other hand, in order to pivot the catch 64 into the unlocked position, this string 63 forming a remote-control device 65.

In the normal work position, the cutting mechanism 4 rests on the ground S substantially horizontally, extends transversely to the direction of forward travel 9 and is lightened by the lightening device 20. During work, the mower is moved in the plot to be mown. For the cutting mechanism 4 to adapt as best possible to the relief of the ground, this mechanism can pivot about the longitudinal axis 10a of the first articulation 10 connecting the carrying beam 3 to the hitch structure 2 and about the longitudinal axis 11a of the second articulation 11. For this purpose, the operating element 26 of the operating device 5 consists, according to the example represented, of a single-acting hydraulic jack 66 in communication with the hydraulic circuit (not represented) of the motor vehicle 7 from which it can be actuated. During work, the hydraulic circuit (not represented) of the motor vehicle 7 is in such a configuration that the hydraulic jack 66 can move freely to follow the movements of the cutting mechanism 4. In this way, the cutting mechanism 4 can easily pivot downward about the longitudinal axis 11a of the second articulation 11 which has the effect of lengthening the hydraulic jack 66 and can easily pivot upward about said longitudinal axis 11a. When the cutting mechanism 4 pivots upward about the longitudinal axis 11a, the hydraulic jack 66 remains substantially immobile and the fourth articulation 32 connecting the operating element 26 to the first lever 27, and, respectively, the journal 42, slides in the oblong hole 44 of said first lever 27.

In the fully lowered work position of the cutting mechanism 4 (FIG. 3), this mechanism extends downward and the hydraulic jack 66 is lengthened to its maximum extent, the journal 42 extends to the end of the oblong hole 44 furthest away from the third articulation 29 and the third lever 58 is widely detached from the stop 57.

In the specific work position of the cutting mechanism 4 (FIG. 4), this mechanism extends upward, the hydraulic jack 66 is in an intermediate position, the journal 42 extends between the ends of the oblong hole 44 and the third lever 58 rests against the stop 57.

It will be observed that in an intermediate normal work position, when the cutting mechanism 4 has pivoted first of all downward so as to lengthen the hydraulic jack 66 and then somewhat upward about the longitudinal axis 11a of the second articulation 11, the journal 42 extends between the two ends of the oblong hole 44, and this advantageously allows the cutting mechanism 4 to pivot easily thereafter downward and upward about said longitudinal axis 11a within the limits allowed by said oblong hole 44 without having to move said hydraulic jack 66.

The pivoting of the carrying beam 3 about the longitudinal axis 10a of the first articulation 10 is limited by a limiter 67 known to those skilled in the art. This limiter 67 includes a secondary latch 68 intended to lock the relative pivoting of the carrying beam 3 with respect to the hitch structure 2 about said longitudinal axis 10a.

When the operator wishes to bring the mower 1 from the work position into the windrowing position he actuates the hydraulic jack 66 from the motor vehicle 7, and the hydraulic jack shortens and makes the second lever 35 pivot about the longitudinal axis 36a of the sixth articulation 36. The journal 42 moves in the oblong hole 44 until it extends at the end thereof furthest from the third articulation 29. At that instant, with the hydraulic jack 66 still in the process of shortening, the cutting mechanism 4 pivots upward about the longitudinal axis 11a of the second articulation 11 until the moment when the third lever 58 of the latch 56 comes to rest against the stop 57; from this moment on, the cutting mechanism 4 and the carrying beam 3 pivot about the longitudinal axis 10a of the first articulation 10 until the hydraulic jack 66 is shortened to its furthest extent (within the limits allowed by the limiter 67). In this windrowing position (FIG. 4), the carrying beam 3 extends substantially horizontally and the cutting mechanism 4 extends upward.

To return the mower 1 to the work position, all the operator need do is actuate the hydraulic jack 66 so that it can lengthen, and this allows the carrying beam 3 and the cutting mechanism 4 to return to their work position under the action of their self weight.

It will be observed that the mower 1 is brought into the windrowing position merely by means of the hydraulic jack 66, which advantageously allows the hitch structure 2 to remain in its position with respect to the motor vehicle 7 and therefore the universal-jointed transmission shaft 19 connected to said motor vehicle 7 and driving the transmission device 18 to operate under optimum conditions.

When the operator wishes to bring the mower 1 from the work position into the transport position, he first of all raises the hitch structure 2 by means of the hitch device 6 of the motor vehicle 7; the cutting mechanism 4 remains in contact with the ground and the carrying beam 3 pivots downward about the longitudinal axis 10a of the first articulation 10. For this purpose, the limiter 67 lengthens so as to allow the secondary latch 68 to be put in place to prevent the movements of said limiter 67. When the limiter 67 has lengthened as far as possible, that part of the cutting mechanism 4 which is closest to the hitch structure 2 is raised, which makes the cutting mechanism 4 pivot downward about the longitudinal axis 11a of the second articulation 11, which has the effect of detaching the third lever 58 from the stop 57 or of detaching it further from said stop 57. Next, the operator acts on the string 63 of the remote-control device 65, which on the one hand makes the catch 64 pivot into the unlocked position and on the other hand makes the third lever 58 pivot upward to neutralize the action of the latch 56. While this is happening, the catch 64 drives the secondary latch 68 into its locked position. At the same time as sustaining his action on the string 63, the operator also actuates the hydraulic jack 66 which shortens and makes the cutting mechanism 4 pivot upward about the longitudinal axis 11a of the second articulation 11 by means of the operating member 25 until it reaches a substantially vertical position.

As soon as the cutting mechanism 4 is in its transport position, the operator stops actuating the hydraulic jack 66 and releases his action on the string 63 to allow the catch 64 to catch on the carrying structure 13 of the cutting mechanism 4. The mower 1 is in the transport position.

To bring the mower 1 from the transport position into the work position, the operator will carry out the various operations in the reverse order.

It will, however, be noted that in the transport position the second lever 35 extends upward in the direction of the hitch structure 2 and the third articulation 29, the fourth articulation 32, the seventh articulation 37 and the eighth articulation 59 are situated on the same side of the second vertical plane 48 as the hitch structure 2.

Finally, various modifications remain possible, especially as regards the construction of the various elements or by substituting technical equivalents, without in any way departing from the field of protection defined by the claims.

What is claimed as new and desired to be secured by Letters Patent of the United States is:

1. A mower including:
   a cutting mechanism extending:
      in a work position, transversely to a direction of forward travel and level with the ground, and
      in a windrowing position, transversely to said direction of forward travel and a certain distance above the ground;
   a hitch structure intended to be connected to a hitch device of a motor vehicle;
   a carrying beam connected to the hitch structure by means of a first articulation and to the cutting mechanism by means of a second articulation;
   an operating device making it possible to bring the cutting mechanism at least into the work position and into the windrowing position and including:
      an operating member connected to the cutting mechanism and comprising:
         a first lever connected to said cutting mechanism by means of a third articulation, and
         a latch intended to stop the upward pivoting of the cutting mechanism about the longitudinal axis of the second articulation during bringing into the windrowing position; and
         an operating element connected at one of its ends to said operating member by means of a fourth articulation and at the other of its ends to the hitch structure by means of a fifth articulation;
   wherein the operating member additionally includes a second lever connected on the carrying beam by means of a sixth articulation and on the first lever by means of a seventh articulation.

2. A Mower as claimed in claim 1, wherein said articulations have a respective axis pointing forward, substantially in the direction of forward travel during work.

3. A Mower as claimed in claim 1, wherein, in the normal work position, the seventh articulation connecting the second lever to the first lever is situated higher up than the second articulation connecting the carrying beam to the cutting mechanism.

4. A Mower as claimed in claim 3, wherein, in the normal work position and viewed along the longitudinal axis of the second articulation connecting the carrying beam to the cutting mechanism, the seventh articulation connecting the second lever to the first lever is situated between said second articulation and the third articulation connecting the first lever to the cutting mechanism.

5. A Mower as claimed in claim 3, wherein, viewed along the longitudinal axis of the second articulation connecting the carrying beam to the cutting mechanism, the seventh articulation connecting the second lever to the first lever is substantially coincident with the fourth articulation connecting the operating element to the operating member.

6. A Mower as claimed in claim 1, wherein the third articulation connecting the first lever to the cutting mechanism is situated above the horizontal plane containing the longitudinal axis of the second articulation connecting the carrying beam to the cutting mechanism, whereas the sixth articulation connecting the second lever to the carrying beam is situated below said horizontal plane.

7. A Mower as claimed in claim 1, wherein the sixth articulation connecting the second lever to the carrying beam is situated on the same side of the second vertical plane containing the longitudinal axis of the second articulation connecting the carrying beam to the cutting mechanism as the hitch structure, whereas the third articulation connecting the first lever to the cutting mechanism is situated on the other side of said second vertical plane.

8. A Mower as claimed in claim 1, wherein the latch is intended to come to rest against a stop provided on the carrying beam.

9. A mower as claimed in claim 8, wherein, in the normal work position, the latch extends at least in the vicinity of the stop.

10. A Mower as claimed in claim 8, wherein the cutting mechanism is, for transport, pivoted upward about the longitudinal axis of the second articulation up to a substantially vertical position or beyond and the latch or the stop can be retracted to allow said pivoting.

11. The mower as claimed in claim 10, wherein the latch is designed to be retractable and wherein its neutralization is made by means of a remote-control device.

12. A Mower as claimed in claim 1, wherein the latch consists of a third lever connected to the second lever by means of an eighth articulation.

13. A Mower as claimed in claim 12, wherein the eighth articulation connecting the third lever to the second lever has an axis pointing forward, substantially in the direction of forward travel during work.

14. A Mower as claimed in claim 1, wherein a means is provided which, in the work position, allows the cutting mechanism to move freely about the longitudinal axis of the second articulation connecting the carrying beam to said cutting mechanism.

15. A Mower as claimed in claim 14, wherein said means consists of an oblong hole made longitudinally in the first lever in which the fourth articulation connecting the operating element to said first lever can slide freely.

16. A Mower as claimed in claim 1, wherein, in the work position, the operating element allows the operating member to move freely in order to follow the movements of the cutting mechanism.

17. A mower as claimed in claim 8, wherein, in the normal work position, the latch is in contact with the stop.

18. A mower as claimed in claim 8, wherein, the cutting mechanism is, for transport, pivoted upward about the longitudinal axis of the second articulation up to a substantially vertical position or beyond and the latch and the stop can be retracted to allow said pivoting.

* * * * *